Patented Mar. 2, 1954

2,671,016

UNITED STATES PATENT OFFICE 2,671,016

HERBICIDAL COMPOSITIONS

Floyd B. Erickson and Arthur H. Schlesinger, Dayton, Ohio, assignors to Monsanto Chemical Company, St. Louis, Mo., a corporation of Delaware No Drawing. Application October 23, 1951, Serial No. 252,802

19 Claims. (Cl. 71—2.3)

The present invention provides new and highly valuable herbicidal compositions and methods of destroying or preventing plant growth in which said compositions are employed.

We have found that very efficient and readily obtainable herbicidal compositions are obtained by preparing oil-in-water emulsions of an aromatic ketone selected from the class consisting of benzophenone, alkyl substituted benzophenones in which the alkyl radical has from 1 to 5 carbon atoms, chlorine-substituted benzophenones, bromine-substituted benzophenones, benzophenones having both chlorine and alkyl substituents in which the alkyl substituents contain from 1 to 5 carbon atoms, and benzophenones having both bromine and alkyl substituents in which each alkyl substituent contains from 1 to 5 carbon atoms. Examples of ketones which are useful for the present purpose are benzophenone, 4-tolyl phenyl ketone, bis-4-tolyl ketone, 2-ethylphenyl phenyl ketone, 3-n-propylphenyl phenyl ketone, bis-cumyl ketone, 2,4-di-n-butylphenyl phenyl ketone, bis(2,3-di-isoamylphenyl) ketone, 2,3,4,5-tetramethylphenyl phenyl ketone, bis(pentamethylphenyl) ketone, 4-chlorobenzophenone, 4,4'-dichlorobenzophenone, 2,4'-dichlorobenzophenone, 2,2',4,4'-tetrachlorobenzophenone, 2,2'-3,3',4,4'-hexachlorobenzophenone, 2,3,4-trichlorobenzophenone, 2,3,4,5-tetrachlorobenzophenone, decachlorobenzophenone, 2-bromobenzophenone, 3,3',4,4'-tetrabromobenzophenone, 2,2',-3,3',4,4',5,5'-octabromobenzophenone, 4-chlorophenyl 4-tolyl ketone, 2-chloro-3,4-di-n-butylphenyl 2-chlorophenyl ketone, bis(2,3-dibromo-4-methylphenyl) ketone, etc. There may also be used technical mixtures of chlorinated or brominated benzophenones or technical mixtures of chlorinated or brominated alkyl substituted benzophenones in which there are present from 1 to 10 halogen atoms attached to the benzene nucleus. Herbicidal compositions containing the present ketones are readily obtained by first preparing a solution of the ketone in an organic solvent and then adding the resulting solution to water containing an emulsifying agent to form an emulsion. Because of the very high herbicidal efficiency of the ketones they are present in the herbicidal compositions in only very small concentrations, for example, in concentrations of from 0.1 per cent to 2 per cent by weight of the total weight of the emulsion. Emulsifying agents which may be employed are those customarily used in the art for the preparation of oil-in-water emulsions. Since the present aromatic ketones are highly stable compounds of little chemical reactivity they are not affected by either ionic or nonionic emulsifying agents. Examples of emulsifying agents which may be used include alkylbenzenesulfonates, long chain polyalkylene glycols, long chain succinates, etc.

The emulsions may be used to destroy already existing plant growth by direct application to the undesirable plants, e. g., by spraying, or the emulsions may be employed to prevent plant growth by application to media which normally support plant growth. When employed to prevent plant growth for example in parking areas, highway abutments, railway yards, etc., the emulsions may be applied by spraying only the surface of said media or they may be admixed with said media. Generally, spraying of only the soil surfaces is sufficient to prevent plant growth in areas which are to be kept clear of plants. However the emulsions may be incorporated into customarily employed temporary surfacing materials, e. g., oils, cinders, etc.

The present invention is further illustrated, but not limited, by the following examples:

Example 1

Spray testing of some of the present herbicidal compositions was conducted as follows:

A cyclohexanone solution of the ketone and an emulsifying agent were added to water, the quantity of solution employed being calculated to give emulsions containing 1.0 per cent and 0.3 per cent by weight, respectively, of the ketone, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three-week old corn and bean plants were sprayed with the respective emulsions, two plants of each variety being employed. The spraying was continued until droplets formed on and/or fell from the foliage and stems of the sprayed plants, up to 15 ml. of the aqueous emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made:

| Compound Tested | Effect On— | |
|---|---|---|
| | Bean | Corn |
| Benzophenone: | | |
| 0.3% | Slight injury | Severe injury. |
| 1.0% | Moderate injury | Plant dead, leaves dried. |
| 2,4'-dichlorobenzophenone: | | |
| 0.3% | Moderate injury | Moderate injury. |
| 1.0% | Severe injury, leaves dropped. | Plant dead, leaves dried. |

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of cucumber, beet, radish and rye grass seeds, respectively, were prepared. The surface soil of the seeded boxes was then sprayed with 0.3 per cent and 1.0 per cent emulsions of benzophenone, bis-4-tolyl ketone and 2,4'-dichlorobenzophenone, respectively. The emulsions were prepared as in Example 1. The quantity of each emulsion which was applied was calculated to correspond to either 20 lbs. of the ketone per acre or to 50 lbs./acre. In the present instance 10.8 cc. of the 0.3 per cent emulsion per 25 square inches of surface soil was calculated to correspond to 20 lbs. of the chemical per acre and 9.1 cc. of the 1.0 per cent emulsion to 50 lbs. of the chemical per acre. The sprayed boxes as well as similar seeded but unsprayed test boxes were then maintained at standard conditions of temperature and watering for a period of two weeks. At the end of that time the number of healthy seedlings in each box was counted. Thus the number of non-emerging and damaged seedings was obtained by difference. This difference is designated as "X." "Per cent phytotoxicity" of the herbicidal composition was determined by the ratio of X to the number of healthy seedlings in the controls.

With the emulsions of 2,4'-dichlorobenzophenone there was evidenced from 71 per cent to 100 per cent phytotoxicity to the cucumber, beet, radish and rye grass at the 50 lbs./acre rate of application and a phytotoxicity of from 46 to 70 per cent to the same at the 20 lbs./acre concentration. At the 50 lbs./acre rate the cucumber, radish and rye grass germinated, but the resulting seedlings were burnt after breaking the surface, giving abnormal stands which withered and died. The beet seeds failed to germinate at the 50 lbs. rate. Substantially the same results were obtained with the other ketones at the 20 lbs./acre rate except to a lesser degree.

With the emulsion of bis-4-tolyl ketone against cucumber there was evidenced from 71 per cent to 100 per cent phytotoxicity for the 50 lbs./acre rate and a 47-70 per cent phytotoxicity at the 20 lbs./acre rate. The phytotoxicity against beet and rye grass was less evidenced and substantially no phytotoxicity was demonstrated against the radish.

With the emulsion of benzophenone there was evidenced from 71 per cent to 100 per cent phytotoxicity with each of the four tested varieties at the 50 lbs./acre rate whereas the 20 lbs./acre rate the 71-100 per cent phytotoxicity was evidenced against only cucumbers and beets. In most instances germination occurred but the sprouts were dried and killed as they reached soil level.

While the present aromatic ketones are most advantageously employed as herbicides by incorporating them into an aqueous emulsion as herein described they may also be employed in other plant destroying methods. Thus the ketones may be incorporated into solid carriers such as clay, talc, pumice and bentonite to give herbicidal compositions which may be applied to living plants or to surfaces which are to be freed from plant growth. The present ketones may also be mixed with agricultural pesticides, e. g., liquid or solid insecticides and fungicides. While solutions of the ketones in organic solvents for such ketones may be employed as plant preventing and plant destroying materials, we have found that the aqueous emulsions herein described possess an improved tendency to adhere to the treated surfaces and require less of the active ingredients, i. e., the ketones, to give comparable herbicidal efficiency.

What we claim is:

1. A herbicidal composition comprising an oil-in-water emulsion of an aromatic ketone selected from the class consisting of benzophenone, alkyl substituted benzophenones in which the alkyl radical has from 1 to 5 carbon atoms, chlorine-substituted benzophenones, bromine-substituted benzophenones, benzophenones having both chlorine and alkyl substituents in which each alkyl substituent contains from 1 to 5 carbon atoms and benzophenones having both bromine and alkyl substituents in which each alkyl substituent contains from 1 to 5 carbon atoms, said ketone being present in said emulsion in a quantity which is toxic to plant life.

2. A herbicidal composition comprising an oil-in-water emulsion of a chlorine-substituted benzophenone, said benzophenone compound being present in said emulsion in a quantity which is toxic to plant life.

3. A herbicidal composition comprising an oil-in-water emulsion of an alkyl-substituted benzophenone in which the alkyl radical has from 1 to 5 carbon atoms, said benzophenone compound being present in said emulsion in a quantity which is toxic to plant life.

4. A herbicidal composition comprising an oil-in-water emulsion of benzophenone, said benzophenone being present in said emulsion in a quantity which is toxic to plant life.

5. A herbicidal composition comprising an oil-in-water emulsion of 2,4'-dichlorobenzophenone, said benzophenone compound being present in said emulsion in a quantity which is toxic to plant life.

6. A herbicidal composition comprising an oil-in-water emulsion of bis-4-tolyl ketone, said ketone being present in said emulsion in a quantity which is toxic to plant life.

7. The method of destroying undesirable plants which comprises applying to said plants a toxic quantity of a herbicidal composition comprising as the essential active ingredient an aromatic ketone selected from the class consisting of benzophenone, alkyl-substituted benzophenones in which each alkyl radical has from 1 to 5 carbon atoms, chlorine-substituted benzophenones, bromine-substituted benzophenones, benzophenones having both chlorine and alkyl substituents in which each alkyl substituent contains from 1 to 5 carbon atoms and benzophenones having both bromine and alkyl substituents in which each alkyl substituent contains from 1 to 5 carbon atoms.

8. The method of destroying undesirable plants which comprises applying to said plants a toxic quantity of a herbicidal composition comprising an oil-in-water emulsion of an aromatic ketone selected from the class consisting of benzophenone, alkyl-substituted benzophenones in which the alkyl radical has from 1 to 5 carbon atoms, chlorine-substituted benzophenones, bromine-substituted benzophenones, benzophenones having both chlorine and alkyl substituents in which each alkyl substituent contains from 1 to 5 carbon atoms and benzophenones having both bromine and alkyl substituents in which each alkyl substituent contains from 1 to 5 carbon atoms.

9. The method of destroying undesirable plants which comprises applying to said plants a toxic quantity of a herbicidal composition comprising an oil-in-water emulsion of a chlorine-substituted benzophenone.

10. The method of destroying undesirable plants which comprises applying to said plants a toxic quantity of an oil-in-water emulsion of an alkyl-substituted benzophenone in which the alkyl radical has from 1 to 5 carbon atoms.

11. The method of destroying undesirable plants which comprises applying to said plants a toxic quantity of an oil-in-water emulsion of benzophenone.

12. The method of destroying undesirable plants which comprises applying to said plants a toxic quantity of an oil-in-water emulsion of 2,4'-dichlorobenzophenone.

13. The method of destroying undesirable plants which comprises applying to said plants a toxic quantity of an oil-in-water emulsion of bis-4-tolyl ketone.

14. The method of preventing plant growth which comprises applying to media normally supporting said growth an oil-in-water emulsion of an aromatic ketone selected from the class consisting of benzophenone, alkyl-substituted benzophenones in which the alkyl radical has from 1 to 5 carbon atoms, chlorine-substituted benzophenones, bromine-substituted benzophenones, benzophenones having both chlorine and alkyl substituents in which each alkyl substituent contains from 1 to 5 carbon atoms and benzophenones having both bromine and alkyl substituents in which each alkyl substituent contains from 1 to 5 carbon atoms, said ketone being present in said emulsion in a quantity which is toxic to plant life.

15. The method of preventing plant growth which comprises applying to soil normally supporting said growth an oil-in-water emulsion of an aromatic ketone selected from the class consisting of benzophenone, alkyl-substituted benzophenones in which each alkyl radical has from 1 to 5 carbon atoms, chlorine-substituted benzophenones, bromine-substituted benzophenones, benzophenones having both chlorine and alkyl substituents in which each alkyl substituent contains from 1 to 5 carbon atoms and benzophenones having both bromine and alkyl substituents in which each alkyl substituent contains from 1 to 5 carbon atoms, said ketone being present in said emulsion in a quantity which is toxic to plant life.

16. The method of preventing plant growth which comprises applying to soil normally supporting said growth an oil-in-water emulsion of an alkyl-substituted benzophenone in which each alkyl radical has from 1 to 5 carbon atoms.

17. The method of preventing plant growth which comprises applying to soil normally supporting said growth an oil-in-water emulsion of benzophenone.

18. The method of preventing plant growth which comprises applying to soil normally supporting said growth an oil-in-water emulsion of 2,4'-dichlorobenzophenone.

19. The method of preventing plant growth which comprises applying to soil normally supporting said growth an oil-in-water emulsion of bis-4-tolyl ketone.

FLOYD B. ERICKSON.
ARTHUR H. SCHLESINGER.

References Cited in the file of this patent

FOREIGN PATENTS

| Number | Country | Date |
|--------|---------|------|
| 476,753 | Germany | Dec. 19, 1926 |